United States Patent
Inoue et al.

(10) Patent No.: US 8,584,110 B2
(45) Date of Patent: Nov. 12, 2013

(54) EXECUTION TRACE TRUNCATION

(75) Inventors: Hiroshi Inoue, Yokohama (JP);
Hiroshige Hayashizaki, Kawasaki (JP);
Peng Wu, Rochester, NY (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 13/249,250

(22) Filed: Sep. 30, 2011

(65) Prior Publication Data

US 2013/0086567 A1    Apr. 4, 2013

(51) Int. Cl.
*G06F 9/44* (2006.01)
(52) U.S. Cl.
USPC .......................................................... 717/151
(58) Field of Classification Search
USPC .......................................................... 717/151
See application file for complete search history.

(56) References Cited

U.S. PATENT DOCUMENTS

| 6,785,801 | B2 * | 8/2004 | Duesterwald et al. | 712/209 |
| 2010/0011209 | A1 * | 1/2010 | Kiriansky et al. | 713/166 |
| 2010/0083236 | A1 * | 4/2010 | Porto et al. | 717/128 |
| 2011/0088016 | A1 * | 4/2011 | Ball et al. | 717/128 |

OTHER PUBLICATIONS

R. Rosner et al.; "Selecting long atomic traces for high coverage"; Procs. of ICS'03; Jun. 23-26, 2003.*
V. Bala et al., "Dynamo: A transparent dynamic optimization system," Procs. of PLD 2000.*
Duesterwald, Evelyn et al.; "Software Profiling for Hot Path Prediction: Less is More"; International Conference on Architectural Support for Programming Languages and Operating Systems (ASPLOS); Nov. 12-15, 2000.*
Bebenita, Michael et al.; "Trace-Based Compilation in Execution Environments without Interpreters"; PPPJ '10; Sep. 15-17, 2010.*
R. Rosner et al., "Selecting long atomic traces for high coverage," Procs. of ICS'03, Jun. 23-26, 2003.
V. Bala et al., "Dynamo: A transparent dynamic optimization system," Procs. of PLDI 2000, year 2000.

* cited by examiner

*Primary Examiner* — Wei Zhen
*Assistant Examiner* — Clint Thatcher
(74) *Attorney, Agent, or Firm* — Vazken Alexanian

(57) ABSTRACT

An execution trace of building blocks of computer code includes a head building block at which the execution trace starts, and a tail building block at which the execution trace ends. The building blocks are executable in a sequence from the head building block to the tail building block. The execution trace is truncated at a particular building block of the execution trace, which becomes the tail building block. The particular building block can correspond to a head building block of an additional execution trace, and/or to a loop header building block of a loop within the execution trace and at which the loop is entered. The execution trace is a compilation unit on which basis a trace-based compiler computer program generates an executable version of the code at least by compiling these units.

20 Claims, 5 Drawing Sheets

EXECUTION TRACE TRUNCATION

BACKGROUND

Compilers are computer programs that compile computer code to generate executable versions of the computer code. The computer code may be written by a developer in a human-understandable computer language, for instance, which a compiler then compiles to generate a version of the computer code that is executable by a processor of a computing device. By comparison, the human-understandable version of the computer code, which is typically called source code, is usually not directly executable by a computing device, such as by a processor of the computing device.

Some types of compilers employ a technique known as trace-based compilation. A trace-based compiler compiles computer code into an executable version thereof based on compilation units corresponding to execution traces through the computer code. An execution trace is a particular sequence of execution through the computer code. The execution traces that are used as compilation units by trace-based compilers are typically those that are frequently executed, so that the compilers can optimize these execution traces to provide for better execution performance.

SUMMARY

A method of an embodiment of the invention includes receiving, by a processor, an execution trace of building blocks of computer code. The building blocks include a head building block at which the execution trace starts, and a tail building block at which the execution trace ends. The building blocks are executable in a sequence from the head building block to the tail building block within the execution trace. The method includes truncating the execution trace, by the processor, at a particular building block of the execution trace. As such, the particular building block becomes the tail building block of the execution trace. The particular building block corresponds to a head building block of an additional execution trace. The execution trace is one of a number of compilation units on which basis a trace-based compiler computer program generates an executable version of the computer code at least by compiling the compilation units. The execution trace prior to truncation has a length corresponding to a predetermined maximum allowable trace length, such that recording of the execution trace terminated as a result of the execution trace reaching the predetermined maximum allowable trace length A method of another embodiment of the invention includes receiving, by a processor, an execution trace of building blocks of computer code. The building blocks include a head building block at which the execution trace starts, and a tail building block at which the execution trace ends. The building blocks are executable in a sequence from the head building block to the tail building block within the execution trace. The method includes truncating the execution trace, by the processor, at a particular building block of the execution trace. As such, the particular building block becomes the tail building block of the execution trace. The particular building block corresponds to a loop header building block of a loop within the execution trace and at which the loop is entered. The loop encompasses one or more building blocks that are executable more than one time within the sequence and that include the loop header building block. The execution trace is one of a number of compilation units on which basis a trace-based compiler computer program generates an executable version of the computer code at least by compiling the compilation units.

A computer program product of an embodiment of the invention includes a computer-readable storage medium having computer-readable code embodied therein. The computer-readable code is executable by a processor. The computer-readable code includes first computer-readable code to receive an execution trace of building blocks of computer code. The building blocks include a head building block at which the execution trace starts, and a tail building block at which the execution trace ends. The building blocks are executable in a sequence from the head building block to the tail building block within the execution trace. The computer-readable code includes second computer-readable code to truncate the execution trace at a particular building block of the execution trace. As such, the particular building block becomes the tail building block of the execution trace. The execution trace is one of a plurality of number units on which basis a trace-based compiler computer program generates an executable version of the computer code at least by compiling the compilation units. The particular building block can correspond to a head building block of an additional execution trace, and the execution trace prior to truncation can have a length corresponding to a predetermined maximum allowable trace length, such that recording of the execution trace terminated as a result of the execution trace reaching the predetermined maximum allowable trace length. The particular building block can correspond to a loop header building block of a loop within the execution trace and at which the loop is entered, the loop encompassing one or more of the building blocks that are executable more than one time within the sequence and that includes the loop header building block.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

DETAILED DESCRIPTION

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

As noted in the background section, some types of compilers employ a technique known as trace-based compilation to compile computer code into executable versions thereof based on compilation units corresponding to execution traces through the computer code. Existing trace-based compilation techniques generally have to trade off performance for trace duplication and thus code size. For instance, next-executing tail (NET) trace-based compilation techniques reduce such duplication, and thus reduce size of the resulting executable versions of computer code, but with reduced performance in these resulting executable versions. NET is particularly described in U.S. Pat. No. 6,785,801, and an existing technique similar to NET is described in US published patent application 2010/0011209.

Disclosed herein are techniques to optimize trace-based compilation that reduce this tradeoff between performance and trace duplication or code size. An execution trace includes a number of building blocks of computer code. Each building block may be one or more computer-executable instructions that are typically executed as a group, for instance. The building blocks include a head building block at which the execution trace starts, and a tail building block at which the execution trace ends. The building blocks are executable in a sequence from the head building block to the tail building block within the execution trace.

The trace-based compilation-optimization techniques disclosed herein truncate the execution trace at a particular building block. As such, the particular building block becomes the tail building block of the execution trace. Specifically, the techniques disclosed herein can truncate the execution trace at a particular building block that corresponds to a head building block of another, or additional, execution trace within the computer code in question. Which particular building block that is a head building block of another execution trace within the computer code is selected for truncation of the execution trace in question can be achieved in accordance with a number of conditions disclosed herein. In general, though, it has been found that the trace-based compilation-techniques disclosed herein that truncate execution traces at such particular building blocks result in a better tradeoff between performance and code size.

The techniques disclosed herein can also or alternatively truncate the execution trace at a particular building block that corresponds to the loop header building block of a loop within the execution trace. The loop header building block is the building block at which the loop is entered. Which particular building block that is a loop header building block of a loop within the execution trace is selected for truncation of the execution trace can be achieved in accordance with a number of conditions disclosed herein. In general, though, it has been found that the trace-based compilation-techniques disclosed herein that truncate execution traces at such particular building blocks also result in a better tradeoff between performance and code size.

Furthermore, the techniques disclosed herein differ from existing techniques for compilation optimization. US published patent application 2010/0083236 generates a tree structure by grouping multiple straight-line traces to avoid excessive trace duplication. The techniques disclosed herein do not utilize such trees, and at least in this respect are different. The non-patent literature Rosner et al., "Selecting long atomic traces for high coverage," which appears in the Proceedings of the 17$^{th}$ Annual International Conference on Supercomputing (2003), describes compilation optimization techniques that reduce code size, but with the disadvantage of additional runtime overhead, and at least in this respect, also differs from the techniques disclosed herein.

Figure 1:
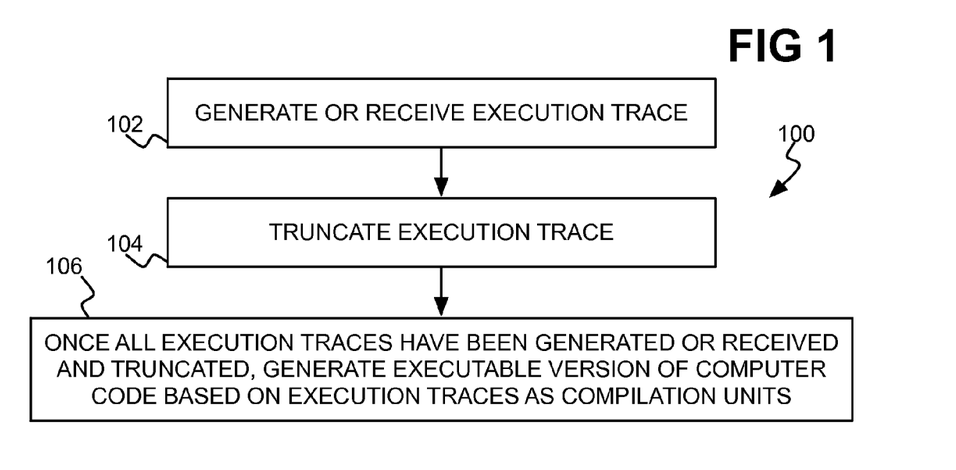
FIG. 1 is a flowchart of a method by which computer code can be compiled using a trace-based compiler, according to an embodiment of the invention.

FIG. 1 shows a method 100 of the basic process by which computer code can be compiled using a trace-based compiler, according to an embodiment of the invention. The method 100, like other methods of other embodiments of the invention, can be performed by a processor of a computing device, like a desktop or laptop computer, for instance. Similarly, methods of embodiments of the invention, including the method 100, can be implemented as computer-readable code stored on a computer-readable data storage medium. Execution of the code by a processor thus results in the performance of the methods in question.

An execution trace is generated or received (102). As noted above, the execution trace tracks the sequence or order of execution of a number of building blocks of computer code. The execution trace includes a head building block at which the execution trace starts, and a tail building block at which the execution trace ends. The building blocks are thus executable in a sequence from the head building block to the tail building block within the execution trace.

The execution trace can be generated, or recorded, in any existing or other manner. The order of execution of the computer code may be followed, for instance. At each building block, a reference or pointer to the building block may be placed in a buffer. As branches and loops are encountered within the computer code, references or pointers to the building blocks in question are thus placed in the buffer. In some embodiments, the execution trace is completed when the number of building blocks that it contains—i.e., the length of the trace—has reached a predetermined maximum allowable trace length.

The execution trace is then truncated (104). The execution trace is truncated at a particular building block of the execution trace, within the sequence or order of execution past the head building block and before the tail building block. As such, the particular building block becomes the (new) tail building block of the execution trace. After truncation, then, the execution trace has the same head building block as before truncation, but has a shorter length, due to the particular building block becoming the new tail building block of the execution trace.

As noted above, the particular building block can correspond to the head building block of an additional, different execution trace, and/or to the loop header building block of a loop within the execution trace in question. Different embodiments of the invention by which such a particular building block is selected are described later in the detailed description. More specifically, the particular building block is selected to satisfy one or more predetermined conditions that govern such selection.

It is noted that truncation of the execution trace is performed in part 104 after the execution trace has been identified, as a result of its being received or having been generated in part 102. That is, truncation of the execution trace, at least in some embodiments of the invention, occurs once an execution trace has been identified, pursuant to existing or other techniques. The point of part 104 is therefore, in at least some embodiments of the invention, to shorten an existing execution trace, to decrease code bloat in subsequent compilation of the computer code at a minimal, if any, cost in execution performance of such an executable version of the computer code.

As such, in one embodiment, once all execution traces have been generated or received, and have been truncated, an executable version of the computer code is generated by compiling at least the execution traces, which serve as compilation units during the compilation process (106). A trace-based compiler computer program thus performs part 106, whereas parts 102 and 104 may be performed by the same or different computer program as a sort of preprocessing that occurs prior to actual compilation. The trace-based compiler generates an executable version of the computer code on the basis of the compilation units that are the execution traces, in an existing or other manner. The compilation process of part 106 is separate from the truncation performed in part 104, and such truncation is not considered part of the compilation process.

It is noted that in a variation of the method 100, part 106 can be performed for each trace, prior to part 104 for all the execution traces having been performed. That is, the compilation of part 106 can be performed as each execution trace is truncated in part 104. In this embodiment, it is not necessary for all the execution traces to have been truncated in part 104 prior to the traces being compiled in part 106.

Figure 2:
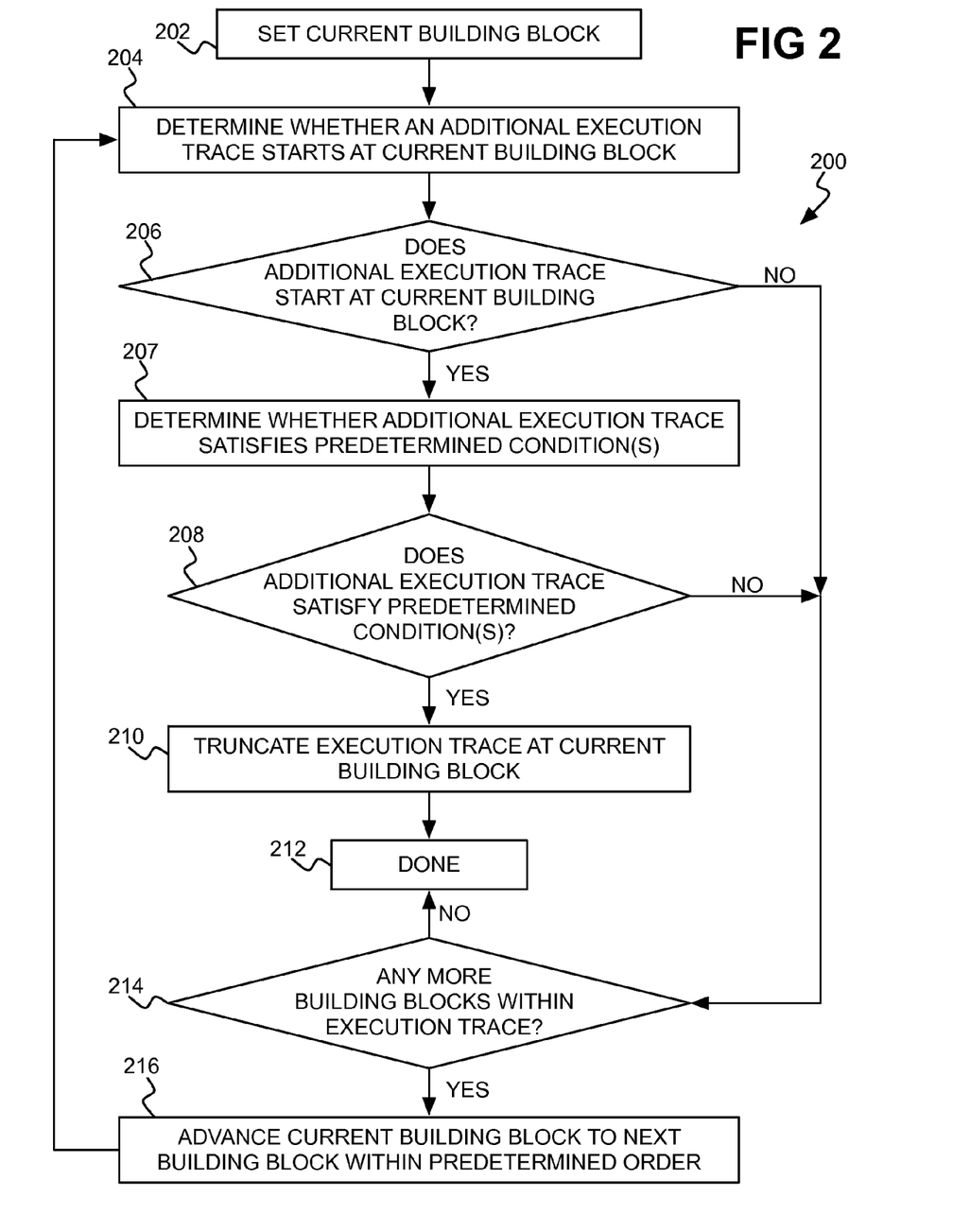
FIG. 2 is a flowchart of a method to truncate an execution trace within the method of FIG. 1, according to an embodiment of the invention.

FIG. 2 shows a method 200 to truncate an execution trace in part 104 of the method 100, according to an embodiment of the invention. The execution trace has a number of building blocks, including a head building block and a tail building block, as noted above. The execution trace has a sequence of execution from the head building block to the tail building block.

What is referred to as a current building block is initially set (202). The current building block can be set to either the head building block or the tail building block. In the former case, the building blocks of the execution trace are proceeded through in a predetermined order corresponding to (i.e., identical to) the sequence in which the building blocks are executable. In the latter case, the building blocks of the execution trace are proceeded through in a predetermined order that is the reverse of the sequence in which the building blocks are executable. Both these cases are described in more detail later in the detailed description, with reference to part 216, below.

It is determined whether an additional execution trace starts at the current building block (204). Thus, if the current building block starts at the head building block and proceeds in the sequence in which the building blocks are executable, the first additional execution trace within this sequence is found. By comparison, if the current building block starts at the last building block and proceeds in the reverse of the sequence in which the building blocks are executable, the last additional execution trace within this sequence is found. It is noted that, in general, there may be zero or more additional execution traces that start at building blocks within the execution trace in relation to which the method 200 is being performed.

If an additional execution trace starts at the current building block (206), then it can be determined whether this additional execution trace satisfies one or more predetermined conditions (207). One such predetermined condition is whether all the building blocks within the sequence of building blocks of the execution trace, starting at the current building block, are part of the additional execution trace. That is, this predetermined condition is, if the execution trace in relation to which the method 200 is being performed is truncated beginning at the current building block, whether the building blocks that will be removed from this execution trace as a result of truncation are part of the additional execution trace. If so, then it is said that the predetermined condition is satisfied, and otherwise the condition is not satisfied.

Another predetermined condition is whether the execution trace does not exit from any process that is part of the computer code and that includes the current building block. For instance, a process, such as a method, function, and so on, may be entered within the computer code. If such a process includes the current building block, and the execution trace exits from this process, then the predetermined condition is not satisfied, and otherwise the condition is satisfied. Exiting from a process may include a return instruction, for example.

If the additional execution trace does satisfy each of the predetermined condition or conditions that have been specified, the execution trace is truncated at the current building block (210). In this case, the current building block is the particular building block referred to in the method 100. The method 200 is then finished (212).

If, however, the additional execution trace does not satisfy each of the predetermined condition or conditions that have been specified (208), and if there are more building blocks within the execution trace that have not yet been set as the current building block (214), then the current building block is advanced to the next building block within the predetermined order (216). Similarly, if no additional execution trace starts at the current building block (206), and if there are more building blocks within the execution trace that have not yet been set as the current building block (214), then the current building block is advanced to the next building block within the predetermined order (216). The predetermined order is as noted above in relation to part 202.

That is, the predetermined order may be identical to the sequence in which the building blocks of the execution trace are executable, or the predetermined order may be the reverse of the sequence in which the building blocks of the execution trace are executable. In the former case, the current building block is initially set to the head building block, and part 216 causes the current building block to advance through the building blocks of the execution trace in accordance with the sequence of execution. In the latter case, the current building block is initially set to the tail building block, and part 216 causes the current building block to advance through the building blocks of the execution trace in accordance with the reverse of the sequence of execution. Once the current building block has been advanced to the next building block in either of these ways, the method 200 is repeated at part 204 as to the new current building block.

However, if there are no more building blocks within the execution trace that have not yet been set as the current building block (214), then the method 200 is finished (212). Where the method 200 finishes by proceeding from part 214 to part 212, this means that the execution trace in relation to which the method 200 has been performed has not been truncated. That is, there is no additional execution trace starting at any building block of the execution trace that satisfies all the predetermined condition(s), if any, which have been specified.

Assuming, though, that the execution trace is truncated via performance of part 210, the additional execution trace that is selected, or determined, in part 204 and that satisfies the predetermined condition(s), if any, in part 207 can be one of three types of execution traces. First, this additional execution trace may be the first execution trace that the execution trace in relation to which the method 200 has been performed overlaps within the sequence in which the building blocks thereof are executable. Second, this additional execution trace may be the last execution trace that the execution trace in relation to which the method 200 has been performed overlaps within the sequence in which the building blocks thereof are executable. Third, this additional execution trace may be an execution trace that the execution trace in relation to which the method 200 has been performed overlaps within the sequence, other than the first such execution trace and the last such execution trace.

Where there are no predetermined conditions that an additional execution trace that starts at a current building block in part 204 has to satisfy in part 207, the additional execution trace is the first execution trace that the execution trace in relation to which the method 200 has been performed overlaps within the sequence where the current building block is set to the head building block in part 202. Similarly, where there are no predetermined conditions that an additional execution trace that starts at a current building block in part 204 has to satisfy in part 207, the additional execution trace is the last execution trace that the execution trace in relation to which the method 200 has been performed overlaps within the sequence where the current building block is set to the tail building block in part 204. However, in other embodiments, even where are no predetermined conditions that an additional execution trace that starts at a current building block in part 204 has to satisfy in part 207, the additional execution trace may be other than the first and last execution traces that the execution trace in relation to which the method 200 has been performed overlaps within the sequence.

Figure 3:
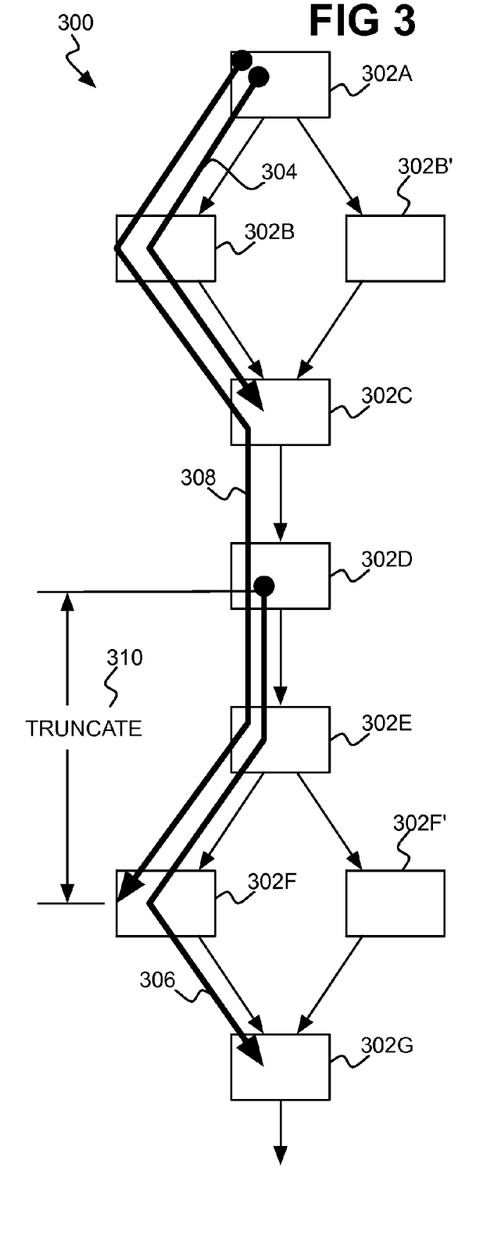
FIGS. 3 and 4 are diagrams of computer code including building blocks, in relation to which example performances of the method of FIG. 2 are described, according to varying embodiments of the invention.

FIG. 3 shows example computer code 300 in relation to which example performance of the method 200 is described, according to an embodiment of the invention. The computer code 300 includes building blocks 302A, 302B, 302B', 302C, 302D, 302E, 302F, 302F', and 302G, which are collectively referred to as the building blocks 302. The sequence of execution of the building blocks 302 is from the building block 302A through to the building block 302G. However, from the building block 302A, just the building block 302B or 302B' is executed, before the building block 302C is executed. Similarly, from the building block 302E, just the building block 302F or 302F' is executed, before the building block 302G is executed.

Three execution traces 304, 306, and 308 are depicted in FIG. 3. The execution trace 304 includes the building blocks 302A, 302B, and 302C, where the building block 302A is the head building block and the building block 302C is the tail building block. The execution trace 306 includes the building blocks 302D, 302E, 302F, and 302G, where the building block 302D is the head building block and the building block 302G is the tail building block. The execution trace 308 includes the building blocks 302A, 302B, 302C, 302D, 302E, and 302F, where the building block 302A is the head building block and the building block 302F is the tail building block.

In the example performance of the method 200 in relation to the execution trace 308, it is presumed that the current building block is set in part 202 to the tail building block 302F of the trace 308. It is further presumed that the predetermined order in which the building blocks 302 of the execution trace 308 are advanced in part 216 is from the tail building block 302F backwards to the head building block 302A. The method 200 iterates through the building blocks 302F and 302E as the current building block before proceeding to the building block 302D, because neither of the (additional) execution traces 304 and 306 starts at the building block 302F or 302E.

However, the (additional) execution trace 306 does start at the building block 302D. Therefore, when the current building block is the building block 302D, the execution trace 308 is truncated at the building block 302D, assuming that the (additional) execution trace 306 satisfies any predetermined condition(s) that have been specified. Such truncation is indicated by reference number 310 in FIG. 3. Therefore, the building block 302D becomes the new tail building block of the execution trace 308 in relation to which the method 200 is being performed. That is, the execution trace 308 no longer includes the building blocks 302E and 302F after truncation.

Figure 4:
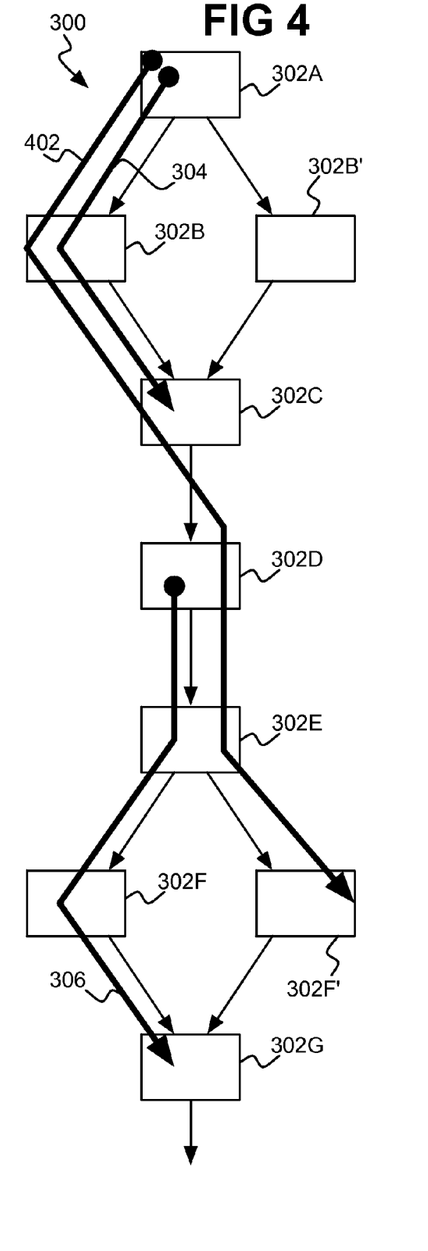

FIG. 4 shows another example performance of the method 200 in relation to the example computer code 300, according to an embodiment of the invention. The computer code 300 again includes the building blocks 302. The sequence of execution of the building blocks 302 is from the building block 302A through to the building block 302G, where either the building block 302B or 302B' is executed, and either the building block 302F or 302F' is executed, as in FIG. 3.

The execution traces 304 and 306 that have been described in relation to FIG. 3 are also present in FIG. 4. Instead of the execution trace 308, however, the execution trace 402 is depicted in FIG. 3. The execution trace 402 includes the building blocks 302A, 302B, 302C, 302D, 302E, and 302F', where the building block 302A is the head building block and the building block 302F' is the tail building block.

In the example performance of the method 200 in relation to the execution trace 402, it is presumed that the current building block is set in part 202 to the tail building block 302F" of the trace 402. It is further presumed that the predetermined order in which the building blocks 302 of the execution trace 402 are advanced in part 216 is from the tail building block 302F' backwards to the head building block 302A. The method 200 iterates through the building blocks 302F' and 302E as the current building block before proceeding to the building block 302D, because neither of the (additional) execution traces 304 and 306 starts at the building block 302F' or 302E.

However, the (additional) execution trace 306 does start at the building block 302D. Therefore, when the current building block is the building block 302D, it is determined whether the (additional) execution trace 306 satisfies the predetermined condition(s) that have been specified, in part 207 of the method 200. It is assumed that one predetermined condition is that the (additional) execution trace 306 has to include all the building blocks 302 that would be removed from the execution trace 402 if the trace 402 were truncated at the (current) building block 302D. However, the (additional) execution trace 306 fails this predetermined condition, because it does not include the building block 302F', which would be removed from the execution trace 402 if the trace 402 were truncated at the building block 302D.

Therefore, the method 200 continues iterating through the building blocks 302C and 302B as the current building block before proceeding to the building block 302A, because neither of the (additional) execution traces 304 and 306 start at the building block 302C or 302B. Since the (additional) execution trace 304 does start at the building block 302A, it is then determined whether the (additional) execution trace 304 satisfies the predetermined condition noted in the previous paragraph. However, the (additional) execution trace 304 also fails this predetermined condition, because it does not include the building blocks 302D, 302E, and 302F', which would be removed from the execution trace 402 if the trace 402 were truncated at the building block 302A.

Once the method 200 has iterated to the building block 302A as the current building block, there are no further building blocks 302 to investigate, since the building block 302A is the head building block of the execution trace 402. Therefore, the method 200 ends in the example of FIG. 4 without truncating the execution trace 402. FIGS. 3 and 4 thus serve to show different performances of the method 200 under a particular predetermined condition, in relation to different execution traces 308 and 402.

Figure 5:
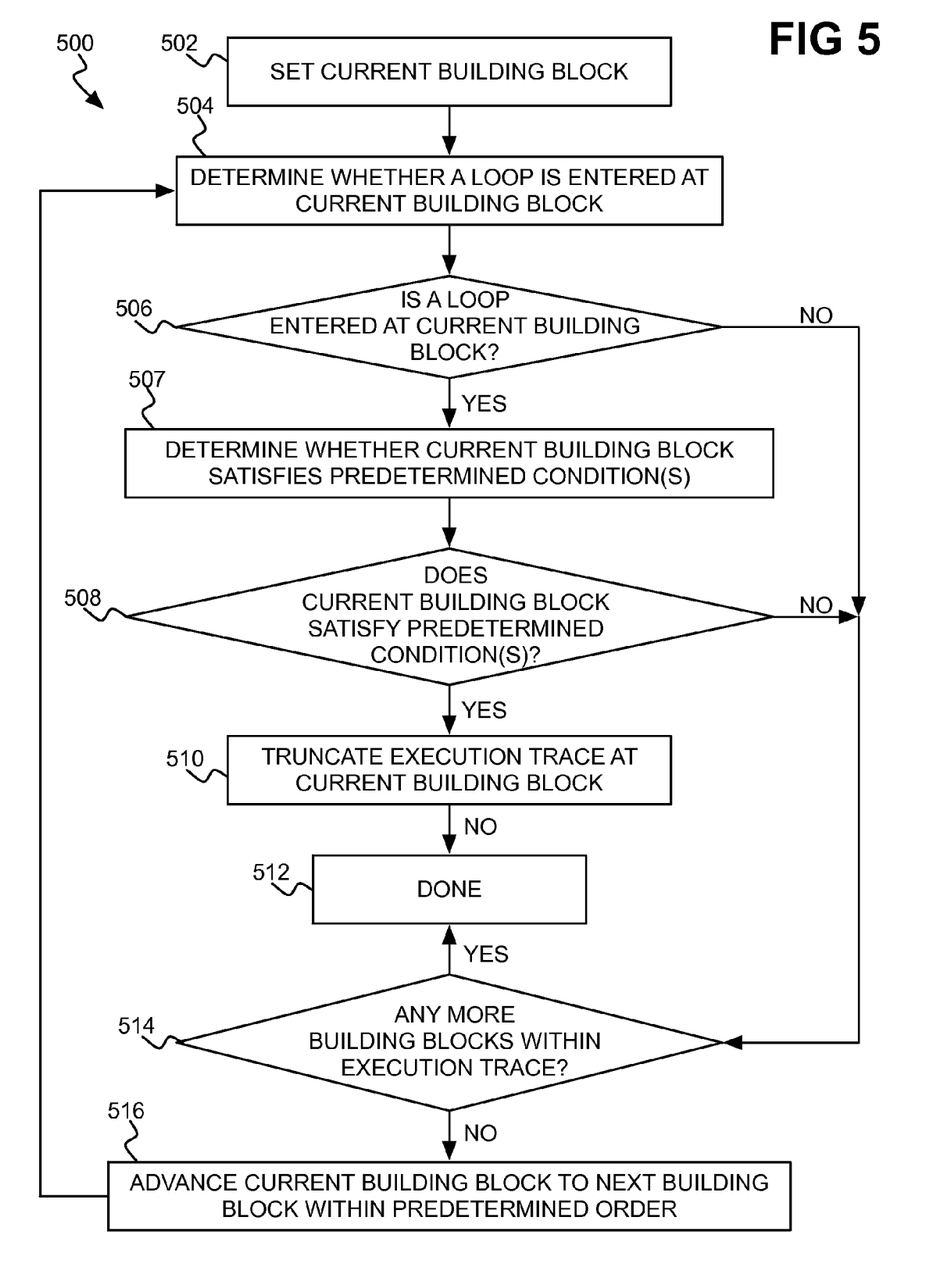
FIG. 5 is a flowchart of a method to truncate an execution trace within the method of FIG. 1, according to another embodiment of the invention.

FIG. 5 shows a method 500 to truncate an execution trace in part 104 of the method 100, according to another embodiment of the invention. The execution trace has a number of building blocks, including a head building block and a tail building block, as noted above. The execution trace has a sequence of execution from the head building block to the tail building block.

The execution trace includes one or more loops. Each loop includes one or more of the building blocks of the execution trace that are executable more than one time within the sequence of execution. That is, a loop of building blocks is looped, repeated, and/or iterated through one or more times. For instance, such a loop can be a repeat-until loop, a while-do loop, a for-next loop, and so on. One of the building blocks of each loop is referred to as the loop header building block, and is the building block of the loop in question at which the loop is entered (including reentered).

A loop can be entered at the loop header building block as a result of a transition within the sequence of execution from one of two different types of edges. The first type of edge is an initial entry edge, which is from a building block of the execution trace that is not part of the loop. The second type of edge is a back or reentry edge, which is from a building block of the execution trace that is part of the loop. Thus, for a given performance of the building blocks of the loop, the loop header building block is entered once at the initial entry edge, and then can be entered one or more subsequent times at one or more back or reentry edges.

A current building block is initial set in the method 500 (502). As in the method 200, the current building block can be set to either the head building block or the tail building block. In the former case, the building blocks of the execution trace are proceeded through in a predetermined order corresponding to the sequence in which the building blocks are executable. In the latter case, the building blocks of the execution trace are proceed through in a predetermined order that is the reverse of the sequence in which the building blocks are executable.

It is determined whether a loop is entered at the current building block (504). That is, it is determined whether the current building block is the loop header building block of a loop that is at least partially encompassed by the execution trace. Thus, if the current building block starts at the head building block and proceeds in the sequence in which the building blocks are executable, the first such loop within this sequence is found. By comparison, if the current building block starts at the last building block and proceeds in the reverse of the sequence in which the building blocks are executable, the last such loop within this sequence is found. It is noted that, in general, there may be zero or more loops that start at building blocks within the execution trace in relation to which the method 500 is being performed.

If a loop is entered at the current building block (506), then it can be determined whether the execution trace and/or the loop, or more specifically the current building block (i.e., the loop header building block of the loop in question), satisfies one or more predetermined conditions (507). One such predetermined condition is whether the tail building block at which the execution trace ends is encompassed by the loop. That is, this predetermined condition is whether the execution trace ends within the loop in question, such that the execution trace does not exit from the loop. If so, then it is said that the predetermined condition is satisfied, and otherwise the condition is not satisfied.

Another predetermined condition is whether the execution trace does not exit from any process that is part of the computer code and that includes the loop. For instance, a process, such as a method, function, and so on, may be entered within the computer code. If such a process includes the loop, and the execution trace exits from this process, then the predetermined condition is not satisfied, and otherwise the condition is satisfied. Exiting from a process may include a return instruction for example.

Another predetermined condition is whether the loop header building block is transitioned to from an initial entry edge or a back edge. The loop header building block may be said to satisfy this condition if it is transitioned to only from an initial entry edge, if it is transitioned to only from a back edge, if it is transitioned from both an initial entry edge and a back edge, or if it is transition to from either or both of an initial entry edge and a back edge, in differing embodiments of the invention. A combination of the above predetermined conditions may also be required.

If the current building block (i.e., the loop header building block to which the current building block corresponds) does satisfy each of the predetermined condition or conditions that have been satisfied (508), the execution trace is truncated at the current building block (510). In this case, the current building block is the particular building block referred to in the method 100. The method 500 is then finished (512).

If, however, the current building block does not satisfy each of the predetermined condition or conditions that have been satisfied (508), and if there are more building blocks within the execution trace that have not yet been set as the current building block (514), then the current building block is advanced to the next building block within the predetermined order (516). Similarly, if the current building block is not the loop header building block of a trace (506), and if there are more building blocks within the execution trace that have not yet been set as the current building block (514), then the current building block is advanced to the next building block within the predetermined order (516). The predetermined order is as noted above in relation to part 502.

That is, the predetermined order may be identical to the sequence in which the building blocks of the execution trace are executable, or the predetermined order may be the reverse of the sequence in which the building blocks of the execution trace are executable. In the former case, the current building block is initially set to the head building block, and part 516 causes the current building block to advance through the building blocks of the execution trace in accordance with the sequence of execution. In the latter case, the current building block is initially set to the tail building block, and part 516 causes the current building block to advance through the building blocks of the execution trace in accordance with the reverse of the sequence of execution. Once the current building block has been advanced to the next building block in either of these ways, the method 500 is repeated at part 504 as to the new current building block.

However, if there are no more building blocks within the execution trace that have not yet been set as the current building block (514), then the method 500 is finished (512). Where the method 500 finishes by proceeding from part 514 to part 512, this means that the execution trace in relation to which the method 500 has been performed has not been truncated. That is, there is no loop that is entered at any building block of the execution trace that satisfies all the predetermined condition(s), if any, which have been specified.

Assuming, though, that the execution trace is truncated via performance of part 510, the loop that is selected, or determined, in part 504 and that satisfies the predetermined condition(s), if any, in part 507 can be one of three types of loops. First, this loop may be the loop that the execution trace in relation to which the method 500 has been performed enters within the sequence in which the building blocks thereof are executable. Second, this loop may be the last loop that the execution trace in relation to which the method 500 has been performed enters within the sequence in which the building blocks thereof are executable. Third, this loop may be a loop that the execution trace in relation to which the method 500 has been performed enters within the sequence, other than the first and last such loops.

Where there are no predetermined conditions that a loop that is entered at a current building block in part 504 has to satisfy in part 507, the loop is the first loop that the execution trace in relation to which the method 500 has been performed enters where the current building block is set to the head building block in part 502. Similarly, where there are no predetermined conditions that a loop that is entered at a current building block in part 504 has to satisfy in part 507, the loop is the last loop that the execution trace in relation to which the method 500 has been performed enters the sequence where the current building block is set to the tail building block in part 504. However, in other embodiments, even where are no predetermined conditions that a loop that starts at a current building block in part 504 has to satisfy in part 507, the loop may be other than the first and last loops that the execution trace in relation to which the method 500 has been performed enters within the sequence.

Figure 6:
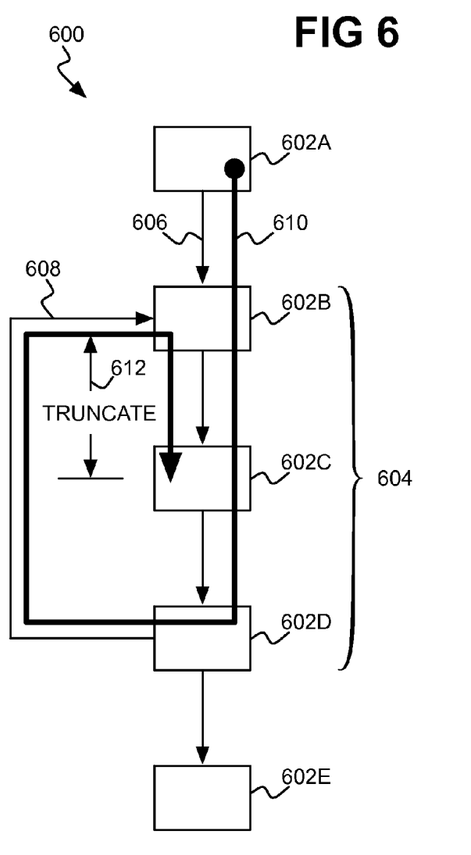
FIGS. 6 and 7 are diagrams of computer code including building blocks, in relation to which example performances of the method 500 are described, according to varying embodiments of the invention.

FIG. 6 shows example computer code 600 in relation to which example performance of the method 500 is described, according to an embodiment of the invention. The computer code includes building blocks 602A, 602B, 602C, 602D, and 602E, which are collectively referred to as the building blocks 602. The sequence of execution of the building blocks 602 is from the building block 602A through to the building block 602E.

The building blocks 602 include a loop 604, made up of the building blocks 602B, 602C, and 602D. From the building block 602D, in other words, the sequence of execution can loop back to the building block 602B, or proceed to the building block 602D. The building block 602B is the loop header building block of the loop 604. The edge 606 from the building block 602A to the loop header building block 602B is the initial entry edge, and the edge 608 from building block 602D back to the building block 602B is a back, or reentry, edge.

FIG. 6 depicts one execution trace 610. The execution trace 610 includes the building blocks 602A, 602B, 602C, 602D, 602B (again), and 602C (again) such that the building blocks 602B and 602C are listed twice in the execution trace 610. The building block 602A is the head building block of the execution trace 610, and the building block 602C is the tail building block of the trace 610. The execution trace 610 thus ends within the loop 604, because the tail building block 602C of the trace 610 is part of the loop 604.

In the example performance of the method 500 in relation to the execution trace 610, it is presumed that the current building block is set in part 502 to the tail building block 602C of the trace 610. It is further presumed that the predetermined order in which the building blocks 602 of the execution trace 610 are advanced in part 516 is from the tail building block 602C backwards to end at the head building block 602A after proceeding through the building blocks 602B, 602D, 602C, and 602B in that order. The method 500 thus starts at the building block 602C. The method 500 iterates through this building block 602C as the current building block before proceeding to the building block 602B, because the building block 602C is not the loop header building block of the sole loop 604 within FIG. 6.

However, the building block 602B is the loop header building block of the loop 604. Therefore, when the current building block is the building block 602B, the execution trace 610 is truncated at the building block 602B, assuming that the building block 602B (or, more generally, the loop 604) satisfies any predetermined condition(s) that have been specified. Such truncation is indicated by reference number 612 in FIG. 6. Therefore, the building block 602B becomes the new tail building block of the execution trace 610 in relation to which the method 500 is being performed. That is, the execution trace 610 no longer includes the building block 602C twice, but rather includes the building block 602C only once, after truncation.

Figure 7:
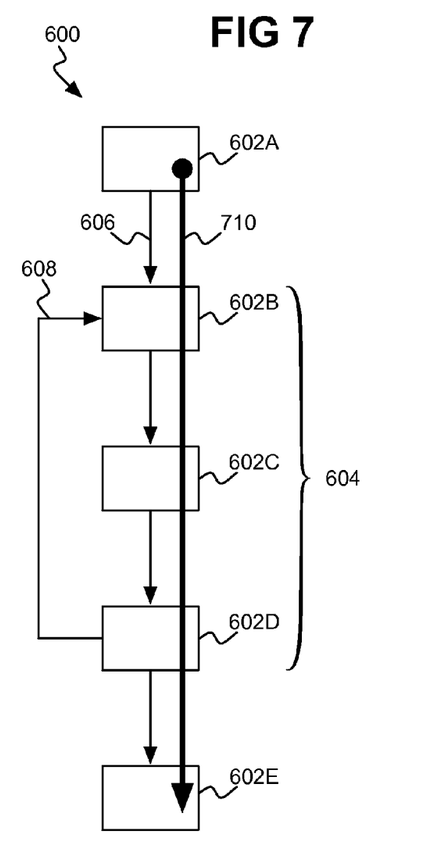

FIG. 7 shows another example performance of the method 500 in relation to the example computer code 600, according to an embodiment of the invention. The computer code 600 again includes the building blocks 602. The sequence of execution of the building blocks 602 is from the building block 602A through to the building block 602E, and can include the loop 604 that has the initial entry edge 606 and the reentry or back edge 608, as in FIG. 6.

FIG. 7 depicts one execution trace 710. The execution trace 710 includes the building blocks 602A, 602B, 602C, 602D, and 602E, where each of the building blocks 602 is listed once in the execution trace 710. The building block 602A is the head building block of the execution trace 710, and the building block 602E is the tail building block of the trace 710. The execution trace 710 does not include the loop 604, insofar as the back edge 608 is never followed within the trace 710. The execution trace 710 further does not end within the loop 604, because the tail building block 602E of the trace 710 is not part of the loop 604.

In the example performance of the method 500 in relation to the execution trace 710, it is presumed that the current building block is set in part 502 to the tail building block 602E of the trace 710. It is further presumed that the predetermined order in which the building blocks 602 of the execution trace 710 are advanced in part 516 from the tail building block 602E backwards to end at the head building block 602A after proceeding through the building blocks 602D, 602C, and 602B in that order. The method 500 thus starts at the building block 602E. The method 500 iterates through the building blocks 602E, 602D, and 602C before proceeding to the building block 602B, because none of the building blocks 602E, 602D, and 602C are the loop header building block of the sole loop 604 within FIG. 7.

However, the building block 602B is the loop header building block of the loop 604. In the example performance of the method 500 in FIG. 7, it is assumed that one predetermined condition that has to be satisfied by the building block 602B (or, more generally, the loop 604 or the execution trace 710) is that the execution trace 710 ends within the loop 604. The execution trace 710, however, does not end within the loop 604 of which the building block 602B is the loop header building block. Therefore, it is said that the loop 604, and more specifically the building block 602B, do not satisfy this predetermined condition. As such, the execution trace 710 is not truncated at the building block 602B in this example.

The method 500 next proceeds by iterating through to the building block 602A as the current building block. The building block 602A is not the loop header building block of the sole loop 604, and therefore the trace 710 is also not truncated at the building block 602A. Once the method 500 has iterated to this building block 602A as the current building block, there are no further building blocks 602 to investigate, since the building block 602A is the head building block of the execution trace 710. Therefore, the method 500 ends in the example of FIG. 7 without truncating the execution trace 710. FIGS. 6 and 7 thus serve to show different performances of the method 700 in relation to different execution traces 610 and 710.

Figure 8:
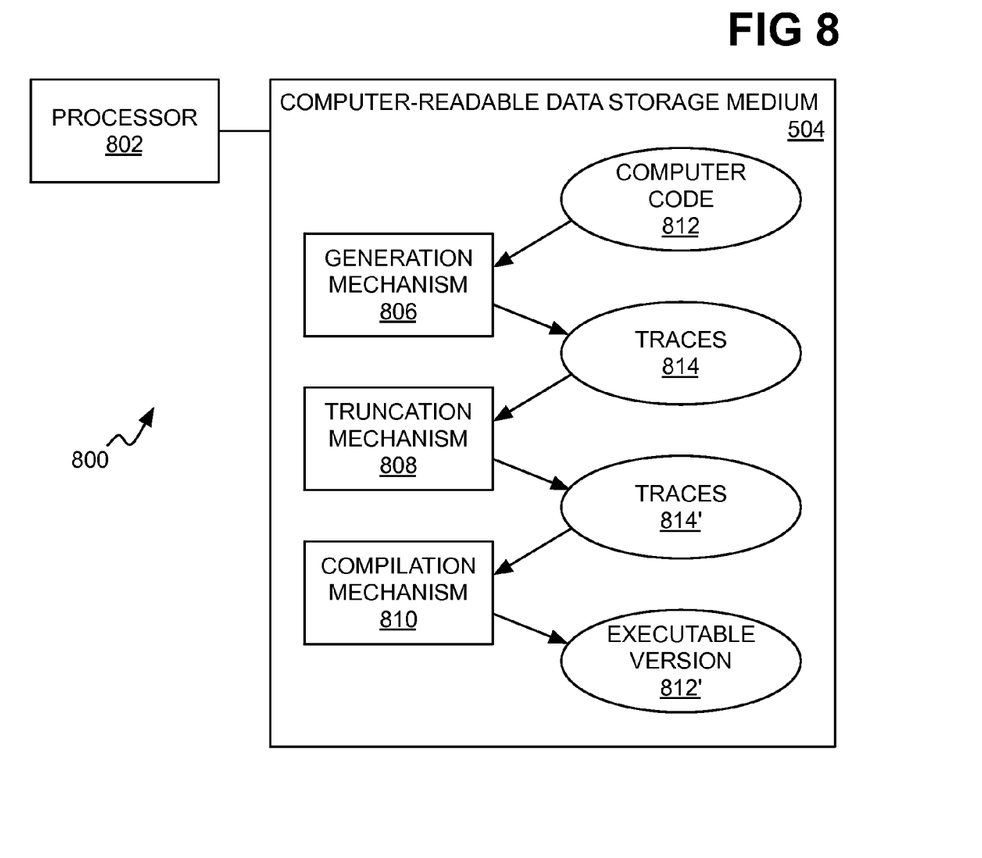
FIG. 8 is a diagram of a representative system, according to an embodiment of the invention.

FIG. 8 shows a computing system 800, according to an embodiment of the invention. The system 800 can be implemented over one or more computing devices, such as computers like desktop computers and laptop computers. The system 800 includes at least a processor 802 and a computer-readable data storage medium 804.

The computer-readable data storage medium 804 stores one or more computer programs that implement a generation mechanism 806, a truncation mechanism 808, and a compilation mechanism 810. As such, execution of these computer programs by the processor 802 results in performance of the functionality provided by the mechanisms 806, 808, and 810. The functionality provided by the mechanisms 806, 808, and 810 is that of the method 100 of FIG. 1.

Specifically, the generation mechanism 806 performs part 102 of the method 100. As such, from computer code 812, the generation mechanism 806 generates execution traces 814. The truncation mechanism 808 performs part 104 of the method 100, and thus can perform the method 200. As such, from the execution traces 814, the truncation mechanism 808 outputs updated execution traces 814', one or more of which may be truncated as compared to the execution traces 814. The compilation mechanism 810 performs part 106 of the method 100. As such, the compilation mechanism 810 compiles the execution traces 814' to generate an executable version 812' of the computer code 812.

Those of ordinary skill within the art can appreciate that a system, method, or computer program product may embody aspects of the present disclosure. Accordingly, aspects of the embodiments of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product that one or more computer readable medium(s) embody. The computer readable medium(s) may embody computer readable program code.

Those of ordinary skill within the art can utilize any combination of one or more computer readable medium(s). The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. An appropriate medium may transmit program code embodied on a computer readable medium. Such appropriate media include but are not limited to wireless, wireline, optical fiber cable, RF, etc., or any suitable combination of the foregoing.

In general, a computer program product includes a computer-readable medium on which one or more computer programs are stored. One or more processors of one or more hardware devices execute the computer programs from the computer-readable medium to perform a method. For instance, the processors may perform one or more of the methods that have been described above.

The computer programs themselves include computer program code. Those of ordinary skill within the art may write computer program code for carrying out operations for aspects of the present disclosure in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, any type of network may connect the remote computer to the user's computer. Such networks include a local area network (LAN) or a wide area network (WAN), or a connection may to an external computer (for example, through the Internet using an Internet Service Provider).

The detailed description has presented aspects of the present disclosure with reference to flowchart illustrations and/or block diagrams of methods, apparatus (systems) and computer program products according to embodiments of the disclosure. Those of ordinary skill within the art can understand that computer program instructions can implement each block of the flowchart illustrations and/or block diagrams, and combinations of blocks in the flowchart illustrations and/or block diagrams. Providing these instructions to a processor of a general purpose computer, special purpose computer, or other programmable data processing apparatus to produce a machine, can result in execution of the instructions via the processor of the computer or other programmable data processing apparatus, to create means for implementing the functions/acts specified in the flowchart and/or block diagram block or blocks.

A computer readable medium may also store these instruction to direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Those of ordinary skill within the art may also load the computer program instructions onto a computer, other programmable data processing apparatus, or other devices to cause the computer, other programmable apparatus or other devices, to perform a series of operational steps. The result is a computer implemented process such that the instructions that execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, execution of two blocks shown in succession may, in fact, occur substantially concurrently, or sometimes in the reverse order, depending upon the functionality involved. Special purpose hardware-based systems that perform specified functions or acts, or combinations of special purpose hardware and computer instructions, can implement each block of the block diagrams and/or flowchart illustration, and combinations of blocks in the block diagrams and/or flowchart illustration.

Although the detailed description has presented specific embodiments, those of ordinary skill in the art can appreciate that they can substitute any arrangement calculated to achieve the same purpose for the specific embodiments shown. This application thus covers any adaptations or variations of embodiments of the present disclosure. As such and therefore, only the claims and equivalents thereof limit this disclosure.

We claim:

1. A method comprising: receiving, by a processor, an execution trace of a plurality of building blocks of computer code including a head building block at which the execution trace starts and a tail building block at which the execution trace ends, the building blocks executable in a sequence from the head building block to the tail building block within the execution trace; and, truncating the execution trace, by the processor, at a particular building block of the plurality of building blocks of the execution trace, such that the particular building block becomes the tail building block of the execution trace, where the particular building block corresponds to a head building block of an additional execution trace, wherein the execution trace is one of a plurality of compilation units on which basis a trace-based compiler computer program generates an executable version of the computer code at least by compiling the compilation units, and wherein the execution trace prior to truncation has a length corresponding to a predetermined maximum allowable trace length, such that recording of the execution trace terminated as a result of the execution trace reaching the predetermined maximum allowable trace length.

2. The method of claim 1, wherein the additional execution trace is one of: a last execution trace that the execution trace overlaps within the sequence from the head building block to the tail building block; a first execution trace that the execution trace overlaps within the sequence from the head building block to the tail building block; and, a middle execution trace that the execution trace overlaps, other than the last execution trace and the first execution trace.

3. The method of claim 1, wherein the additional execution trace includes all the building blocks that are to be removed from the execution trace as a result of truncation thereof.

4. The method of claim 1, wherein the execution trace does not exit from any process that is part of the computer code and that includes the particular building block.

5. The method of claim 1, wherein truncating the execution trace at the particular building block comprises: setting a current building block to one of the building blocks of the execution trace; as an entry point of the method, determining whether the additional execution trace starts at the current building block; where the additional execution trace starts at the current building block, truncating the execution trace at the current building block; and, where the additional execution trace does not start at the current building block, advancing the current building block to a next building block of the building blocks of the execution trace in accordance with a predetermined order through the building blocks 20 of the execution trace, and repeating the method at the entry point.

6. The method of claim 5, wherein one of: the one of the building blocks to which the current building block is set is the tail building block, and the predetermined order is a reverse of the sequence in which the building blocks are executable; the one of the building blocks to which the current building block is set is the head building block, and the predetermined order is identical to the sequence in which the building blocks are executable.

7. The method of claim 5, wherein truncating the execution trace at the current building block comprises truncating the execution trace at the current building block provided that the current building block satisfies a predetermined condition.

8. A method comprising: receiving, by a processor, an execution trace of a plurality of building blocks of computer code including a head building block at which the execution trace starts and a tail building block at which the execution trace ends, the building blocks executable in a sequence from the head building block to the tail building block within the execution trace, the execution trace including a loop encompassing one or more of the plurality of building blocks that are executable more than one time within the sequence and that include a loop header building block at which the loop is entered; and, truncating the execution trace, by the processor, at a particular building block of the plurality of building blocks of the execution trace, such that the particular building block becomes the tail building block of the execution trace, where the particular building block corresponds to the loop header building block of the loop, wherein the execution trace is one of a plurality of compilation units on which basis a trace-based compiler computer program generates an executable version of the computer code at least by compiling the compilation units.

9. The method of claim 8, wherein the tail building block at which the execution trace ends is encompassed by the loop.

10. The method of claim 8, wherein the execution trace does not exit from any process that is part of the computer code and that includes the loop.

11. The method of claim 8, wherein the sequence of execution transitions to the loop at the particular building block from one or more of: an initial entry edge from another building block of the execution trace that is not part of the loop; a back edge from another building block of the execution trace that is part of the loop.

12. The method of claim 8, wherein the loop is one of: a first loop within the execution trace; a last loop within the execution trace; a loop other than the first loop and the last loop within the execution trace.

13. The method of claim 8, wherein truncating the execution trace at the particular building block comprises: setting a current building block to one of the building blocks of the execution trace; as an entry point of the method, determining whether the loop is entered at the current building block; where the loop is entered at the current building block, truncating the execution trace at the current building block; and, where the loop is not entered at the current building block, advancing the current building block to a next building block of the building blocks of the execution trace in accordance with a predetermined order through the building blocks of the execution trace, and repeating the method at the entry point.

14. The method of claim 13, wherein one of: the one of the building blocks to which the current building block is set is the tail building block, and the predetermined order is a reverse of the sequence in which the building blocks are executable; the one of the building blocks to which the current building block is set is the head building block, and the predetermined order is identical to the sequence in which the building blocks are executable.

15. The method of claim 13, wherein truncating the execution trace at the current building block comprises truncating the execution trace at the current building block 20 provided that the current building block satisfies a predetermined condition.

16. A computer program product comprising: a non-transitory, computer-readable storage medium having computer-readable code embodied therein, the computer-readable code executable by a processor and comprising: first computer-readable code to receive an execution trace of a plurality of building blocks of computer code including a head building block at which the execution trace starts and a tail building block at which the execution trace ends, the building blocks executable in a sequence from the heading building block to the tail building block within the execution trace; and, second computer-readable code to truncate the execution trace at a particular building block of the plurality of building blocks of the execution trace, such that the particular building block becomes the tail building block of the execution trace, wherein the execution trace is one of a plurality of compilation units on which basis a trace-based compiler computer program generates an executable version of the computer code at least by compiling the compilation units, and wherein one or more of: the particular building block corresponds to a head building block of an additional execution trace, and the execution trace prior to truncation has a length corresponding to a predetermined maximum allowable trace length, such that recording of the execution trace terminated as a result of the execution trace reaching the predetermined maximum allowable trace length; the particular building block corresponds to a loop header building block of a loop within the execution trace and at which the loop is entered, the loop encompassing one or more of the plurality of building blocks that are executable more than one time within the sequence and that includes the loop header building block.

17. The computer program product of claim 16, wherein the additional execution trace is one of: a last execution trace that the execution trace overlaps within the sequence from the head building block to the tail building block; a first execution trace that the execution trace overlaps within the sequence from the head building block to the tail building block; and, a middle execution trace that the execution trace overlaps, other than the last execution trace and the first execution trace.

18. The computer program product of claim 16, wherein the additional execution trace includes all the building blocks that are to be removed from the execution trace as a result of truncation thereof.

19. The computer program product of claim 16, wherein the execution trace does not exit from any process that is part of the computer code and that includes one or more of the loop and the particular building block.

20. The computer program product of claim 16, wherein one or more of: the tail building block at which the execution trace ends is encompassed by the loop; the sequence of execution transitions to the loop at the particular building block from one or more of: an initial entry edge from another building block of the execution trace that is not part of the loop, and a back edge from another building block of the execution trace that is part of the loop; the loop is one of: a first loop within the execution trace, a last loop within the execution trace, and a loop other than the first loop and the last loop within the execution trace.

* * * * *